US012790835B2

(12) United States Patent
Michel et al.

(10) Patent No.: US 12,790,835 B2
(45) Date of Patent: Nov. 10, 2026

(54) DEVICE FOR SPRAYING AN INSULATION PRODUCT

(71) Applicant: SAINT-GOBAIN ISOVER, Courbevoie (FR)

(72) Inventors: Alexia Michel, Paris (FR); David Luis, Breuil le Vert (FR)

(73) Assignee: SAINT-GOBAIN ISOVER, Courbevoie (FR)

( * ) Notice: Subject to any disclaimer, the term of this patent is extended or adjusted under 35 U.S.C. 154(b) by 908 days.

(21) Appl. No.: 17/787,139

(22) PCT Filed: Dec. 18, 2020

(86) PCT No.: PCT/FR2020/052549
§ 371 (c)(1),
(2) Date: Jun. 17, 2022

(87) PCT Pub. No.: WO2021/123677
PCT Pub. Date: Jun. 24, 2021

(65) Prior Publication Data

US 2023/0019937 A1 Jan. 19, 2023

(30) Foreign Application Priority Data

Dec. 20, 2019 (FR) ....................................... 1915096

(51) Int. Cl.
*B05B 7/14* (2006.01)
*E04F 21/08* (2006.01)
*E04F 21/12* (2006.01)

(52) U.S. Cl.
CPC .............. *E04F 21/085* (2013.01); *B05B 7/14* (2013.01); *E04F 21/12* (2013.01)

(58) Field of Classification Search
CPC ......... E04F 21/08; E04F 21/085; E04F 21/12; F16K 3/18; F16K 3/182; F16K 3/184;
(Continued)

(56) References Cited

U.S. PATENT DOCUMENTS 2,200,713 A 5/1940 Ericson et al.
3,195,819 A * 7/1965 Watanabe ............. B05B 5/0411 239/592

(Continued)

FOREIGN PATENT DOCUMENTS

FR 3 046 182 A1 6/2017

OTHER PUBLICATIONS

International Search Report as issued in International Patent Application No. PCT/FR2020/052549, dated May 3, 2021.

*Primary Examiner* — Arthur O. Hall
*Assistant Examiner* — Juan C Barrera
(74) *Attorney, Agent, or Firm* — CUSHMAN PARTNERS LLC

(57) ABSTRACT

A device for preparing an insulation product based on wool, includes a chamber including an inlet opening through which a stream of carrier gas and a wool in the form of nodules or flakes are introduced, at least one system configured to generate a turbulent gas flow in said chamber, and an outlet opening through which flakes mixed with an outlet gas stream are expelled, and a system for adjusting the outlet opening that makes it possible to control the area of the outlet opening.

13 Claims, 9 Drawing Sheets

(58) Field of Classification Search
CPC .......... F16K 3/186; F16K 3/02; F16K 3/0218; F16K 3/0254; F16K 3/0281; B05B 1/30; B05B 1/3026; B05B 1/3073; B05B 1/308; B05B 1/3086; B05B 7/1409; B05B 7/0025; B05B 7/1486; B05B 7/00; B05B 7/0075; B05B 7/0081; B05B 7/14; B05B 7/1404; B05B 7/1413; B05B 7/144; B05B 7/1454; B05B 7/1459; B05B 7/1463; B05B 7/1472; B05B 7/24; B65D 5/723; B65D 5/646; B65D 41/026; B65D 43/20; E04B 1/7604
USPC ........................ 138/89, 92; 220/345.1; 239/8
See application file for complete search history.

(56) References Cited

U.S. PATENT DOCUMENTS

| | | | | |
|---|---|---|---|---|
| 6,012,263 | A * | 1/2000 | Church | B05B 7/1431 52/404.1 |
| 2008/0128420 | A1* | 6/2008 | Wang | B65D 51/242 220/345.1 |
| 2008/0217422 | A1 | 9/2008 | Near | |
| 2015/0152001 | A1* | 6/2015 | Beaufils | C03B 7/005 65/325 |
| 2015/0283577 | A1* | 10/2015 | Zhang | B05B 7/149 118/317 |

* cited by examiner

[Fig. 1]
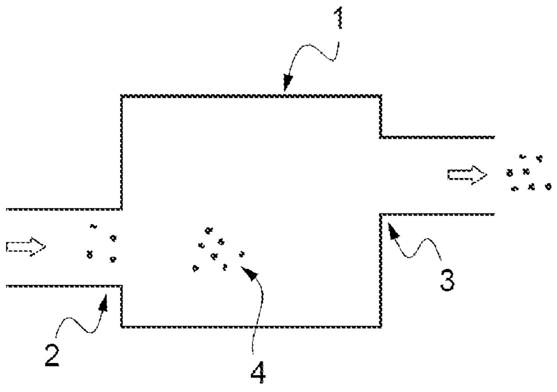
[Fig. 2]
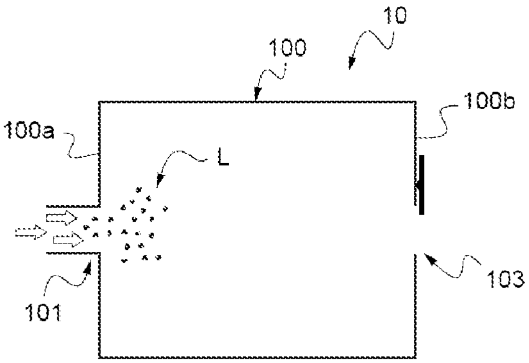
[Fig. 3]
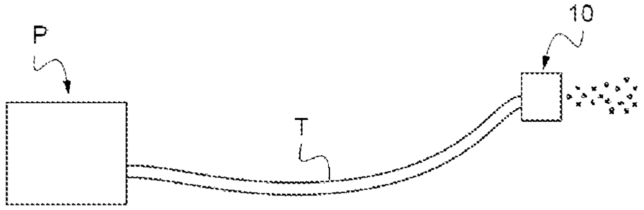

[Fig. 4a]
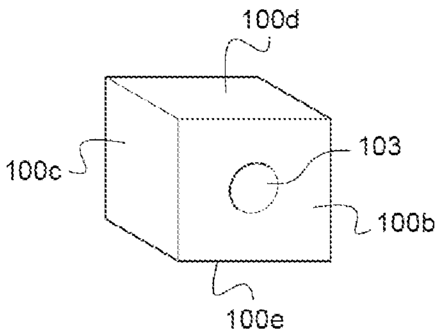
[Fig. 4b]
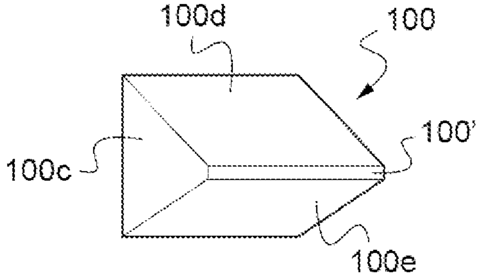
[Fig. 4c]
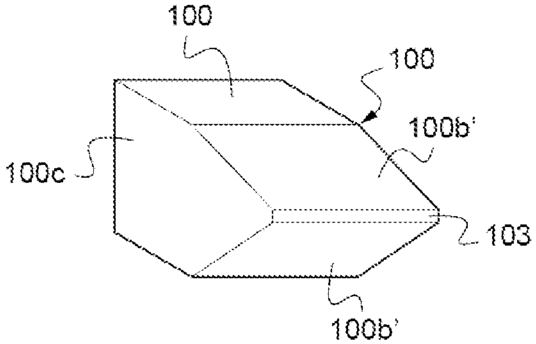

[Fig. 5]
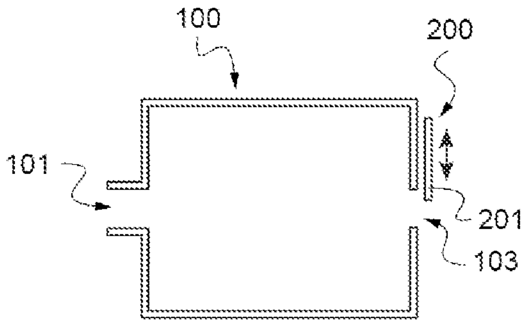
[Fig. 6a]
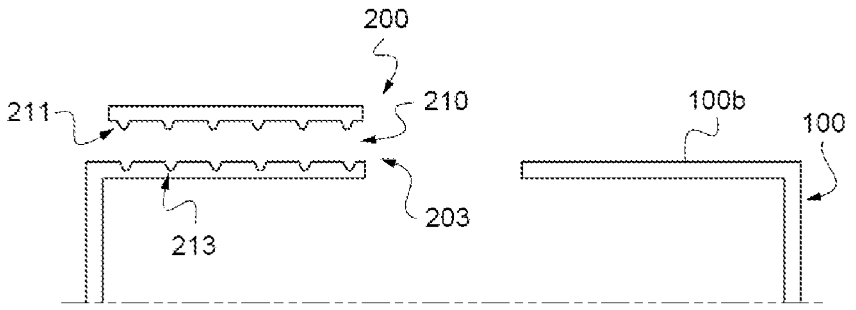
[Fig. 6b]
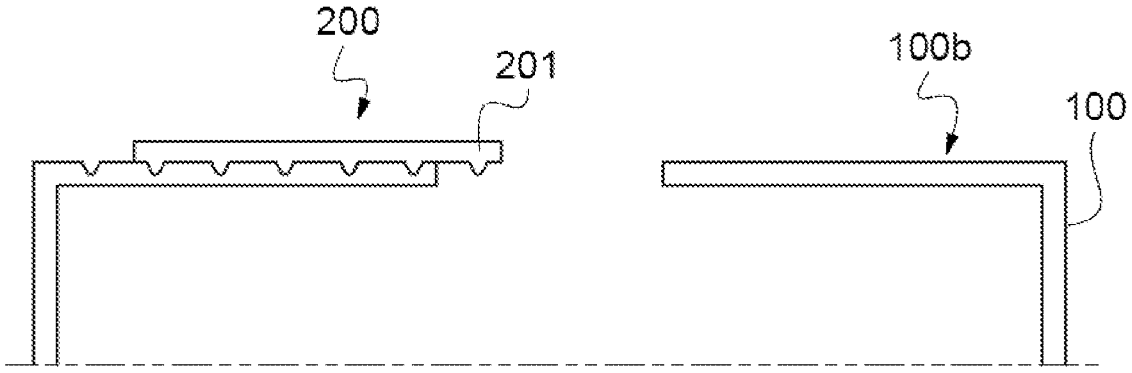

[Fig. 7]
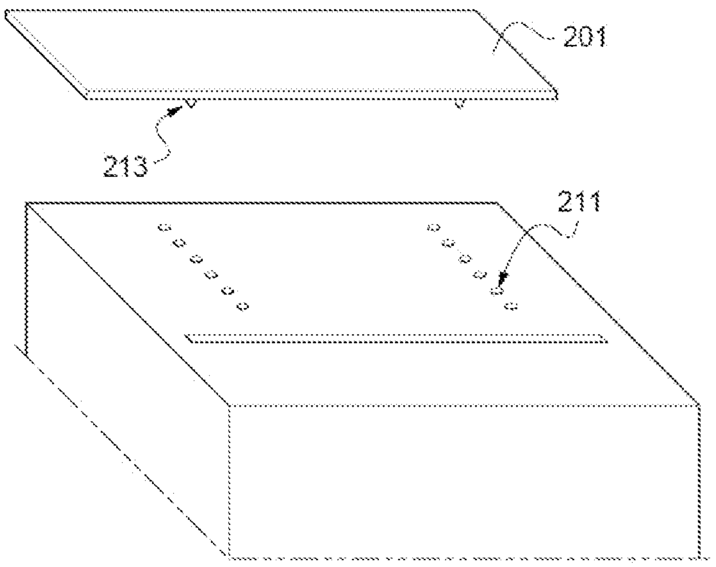
[Fig. 8]
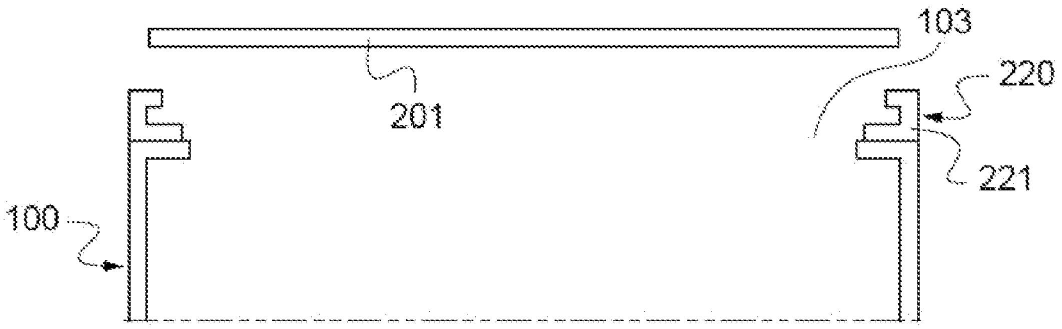
[Fig. 9]
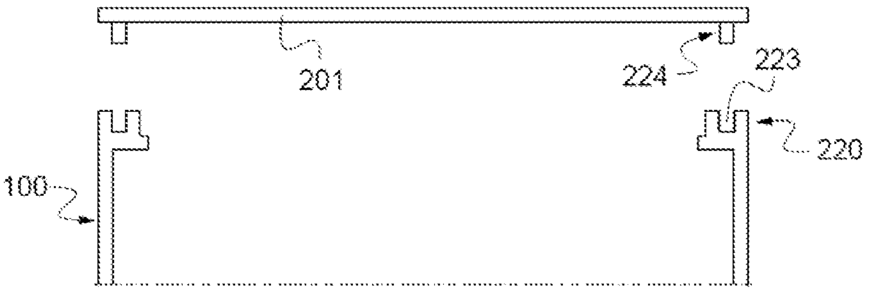

[Fig. 10]
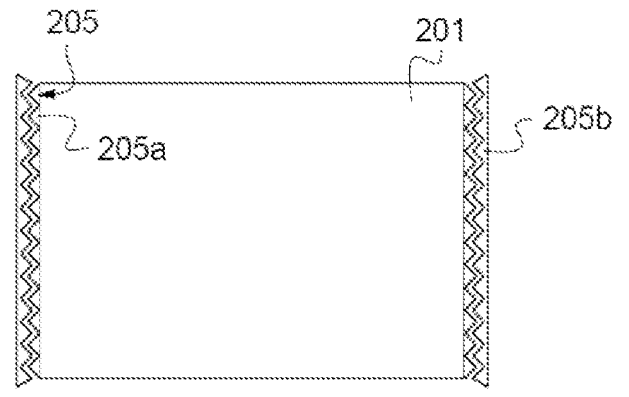
[Fig. 11]
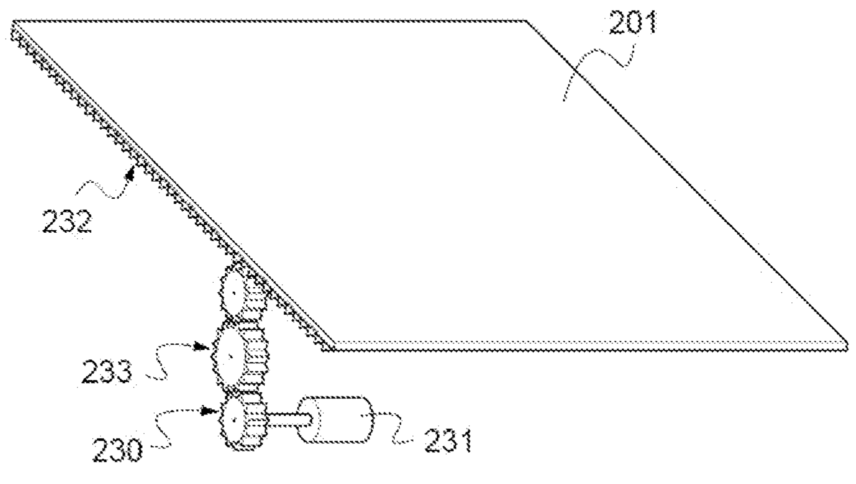
[Fig. 12]
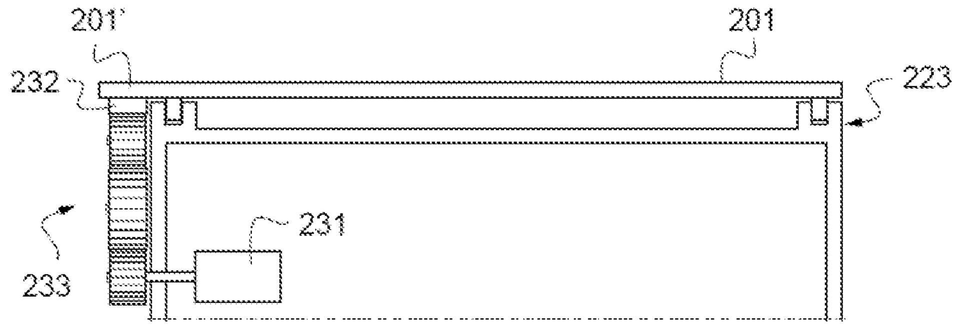

[Fig. 13]
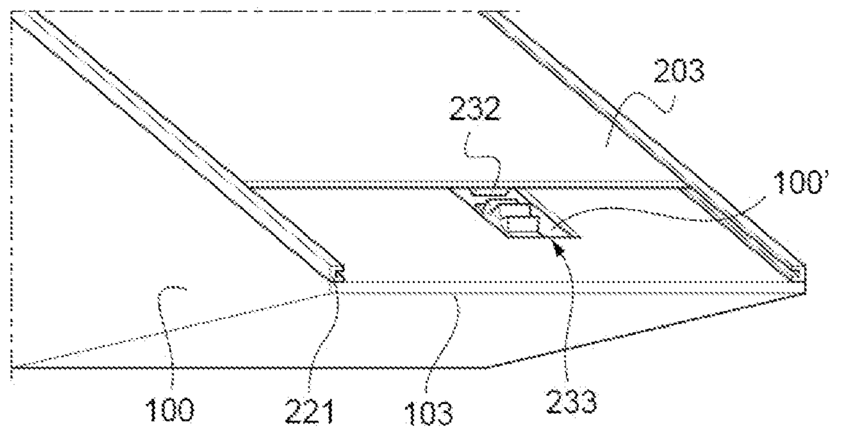
[Fig. 14]
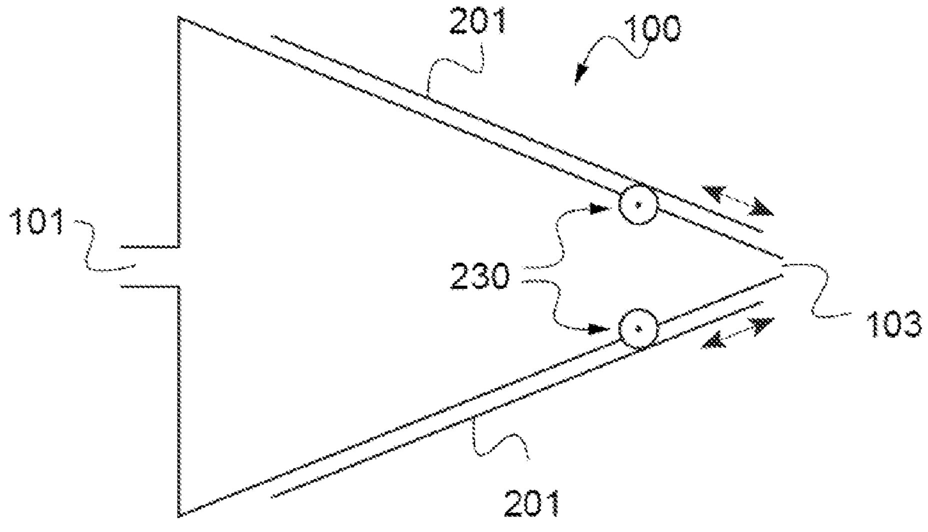

[Fig. 15]
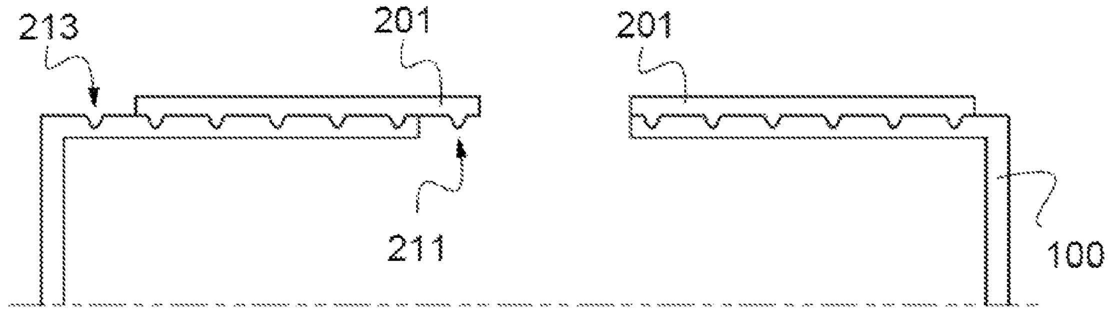
[Fig. 16]
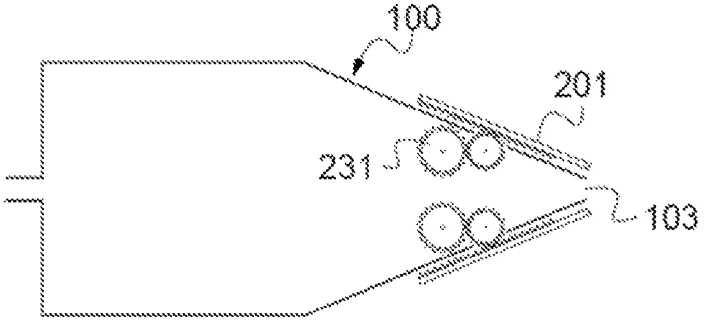

[Fig. 17]
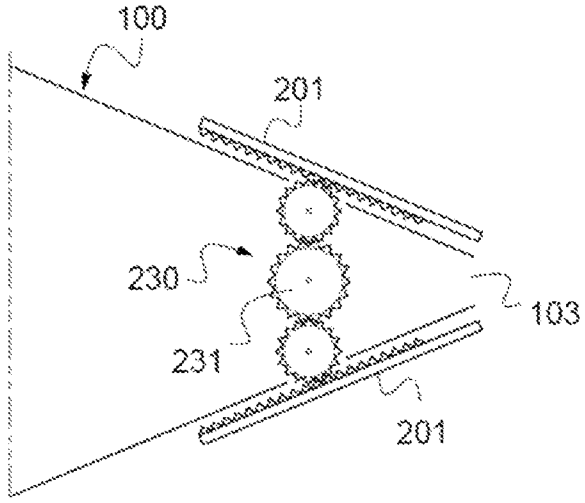
[Fig. 18a]
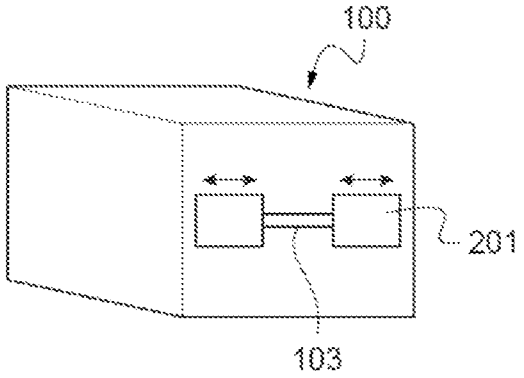
[Fig. 18b]
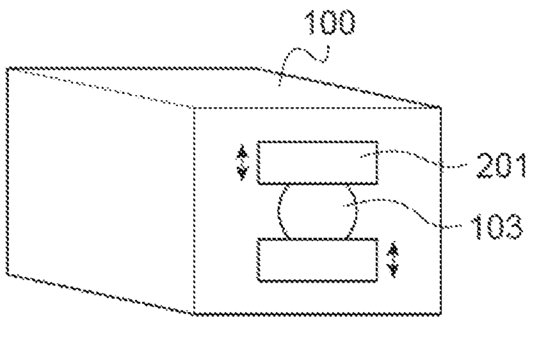

[Fig. 19]
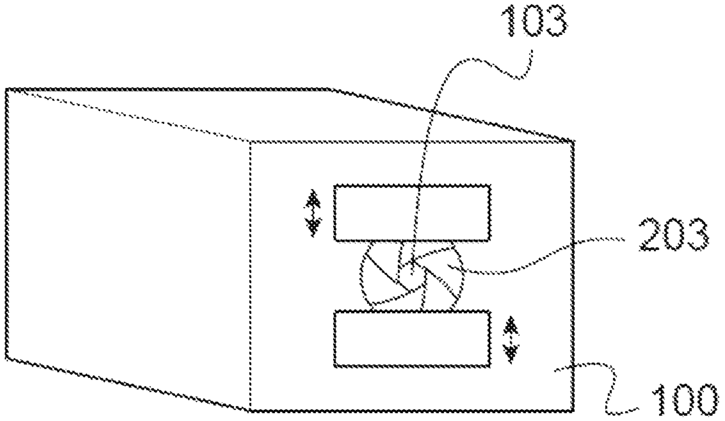

DEVICE FOR SPRAYING AN INSULATION PRODUCT

CROSS-REFERENCE TO RELATED APPLICATIONS

This application is the U.S. National Stage of PCT/FR2020/052549, filed Dec. 18, 2020, which in turn claims priority to French patent application number 1915096 filed Dec. 20, 2019. The content of these applications are incorporated herein by reference in their entireties.

PRIOR ART

The invention relates to an aeration device, for spraying insulation product.

Mineral wool is a very good thermal and acoustic insulator since it comprises entangled mineral fibers, giving it a porous and elastic structure. Such a structure makes it possible to trap air and absorb or attenuate noise. Moreover, mineral wool is manufactured mainly from mineral materials, in particular natural materials or recycled products (recycled glass), and thus exhibits an advantageous environmental balance. Lastly, since mineral wool is based on naturally noncombustible materials, it does not feed fire and does not spread flames. Preferably, the mineral wool is chosen from glass wool or rock wool.

There exist products of the loose-fill type, which are in the form of small bundles of entangled fibers forming particles on a centimeter scale, in which no bonding agent ensures the cohesion of the fibers in the bundles.

The manufacture of loose-fill mineral wool has at least the following steps:

- a step of melting the raw materials such as glass in a melting furnace,
- a fiberizing step,
- a step of forming a mat of mineral wool,
- a step of nodulation by grinding.

The manufacture of loose-fill mineral wool may also comprise the following steps:

- a step of coating with agents such as antistatic agents and/or a cohesion additive, prior to, at the same time as, or following nodulation, and/or
- a bagging step.

At the end of the nodulation step, the mineral wool is in the form of nodules or flakes. The mineral wool can then be used as such as a loose-fill insulation product or loose-fill insulation by spreading it, blowing it or using it to fill cavities. Loose-fill insulation corresponds, in the building sector, to a variety of materials offered in the form of small particles, the texture of which varies from granular to flake-like.

Mineral wool is advantageously used in the form of nodules or flakes as main constituents in loose-fill insulation products for spaces that are difficult to access such as the floors of attic spaces that have not been developed or are difficult to access.

These loose-fill insulation products are generally applied by mechanical blowing with the aid of a blowing machine that makes it possible to spray an insulation product over a surface or inject it into a cavity from an outlet pipe.

The loose-fill insulation products are therefore mostly installed by being sprayed directly into the space to be insulated such as attics or by being injected into a wall cavity.

The loose-fill insulation products are also known as blown insulation products.

The insulation product, once blown, needs to be as homogeneous as possible in order to avoid thermal bridging and thus to improve thermal performance. However, when the insulation product is blown, whatever the diameter of the outlet pipe, the mineral wool in the form of nodules or flakes is not entirely homogeneous. The thermal conductivity of the resulting insulation product is not optimized.

In this regard, there exist, as shown in FIG. 1, chambers 1 provided with an inlet opening 2 and an outlet opening 3, the configuration of which allows the flakes 4 to be aerated under the effect of a turbulent gas stream that allows said flakes to move at random in said chamber for a predefined time before exiting.

However, these chambers for aerating the wool are unable to solve all of the problems that an operator may encounter on a site. This is because, while the chamber makes it possible to aerate the flakes in order to improve the thermal properties, this chamber is bulky and is not easy to handle, therefore not allowing good quality blowing.

This bulkiness is all the more bothersome when the operator needs to move around with the aeration chamber in order to blow the wool over the entire surface of the room to be insulated.

SUMMARY OF THE INVENTION

The present invention seeks to solve the problems of aeration chambers known from the prior art by providing a chamber that makes it possible to homogenize the amount of particles/nodules over its scope of action.

To this end, the present invention relates to a device for preparing an insulation product based on wool, comprising a chamber comprising an inlet opening through which a stream of carrier gas and a wool in the form of nodules or flakes are introduced, at least one means capable of generating a turbulent gas flow in said chamber, and an outlet opening through which flakes mixed with an outlet gas stream are expelled, characterized in that said device also comprises a system for adjusting the outlet opening that makes it possible to control the area of the outlet opening from 0 to 100%.

Advantageously, the present invention consists in varying the intensity and the pressure of the outlet gas stream from the chamber, making it possible to increase the radius of action of the device for preparing an insulation product based on wool.

According to one example, the system for adjusting the outlet opening comprises at least one shutter arranged on one of the faces of the chamber and means for positioning the shutter. According to one example, the means for positioning the shutter comprise a plurality of blind holes arranged, on said face of the chamber, in at least one line and at least one pair of studs arranged on said shutter in order to fit in two blind holes.

According to one example, the plurality of blind holes are arranged in two parallel lines, said shutter comprising at least two pairs of studs arranged such that each stud of a pair fits into a hole in a different line.

According to one example, the means for positioning the shutter comprise a rail system comprising two receiving rails arranged on the chamber and two sliding rails arranged on the shutter, the arrangement of said sliding rails being such that said sliding rails fit in the receiving rails so as to slide.

According to one example, the means for positioning the shutter comprise indexing means for locking the position of said shutter with respect to the receiving rails.

According to one example, the means for positioning the shutter comprise drive means comprising at least one motor, at least one serration-engagement element arranged on the shutter and at least one gear element for creating the mechanical link between said motor and the serration-engagement element.

According to one example, the system for adjusting the outlet opening comprises two shutters that are each arranged on one of the faces of the chamber and means for positioning the shutters.

According to one example, the means for positioning the shutter comprise, for each shutter, drive means comprising a motor, at least one serration-engagement element arranged on the shutter and at least one gear element for creating the mechanical link between said motor and the serration-engagement element.

According to one example, the means for positioning the shutter comprise drive means comprising a motor, at least one serration-engagement element arranged on each shutter and at least one gear element for creating the mechanical link between said motor and the serration-engagement element of each shutter.

According to one example, the system for adjusting the outlet opening comprises at least one diaphragm arranged at the outlet opening, which is preferably circular.

According to one example, the chamber comprises an inlet face for the inlet opening, an outlet face for the outlet opening, two side faces, an upper face and a lower face, said at least one shutter being arranged on the outlet face.

According to one example, the chamber comprises an inlet face for the inlet opening, two side faces, an upper face and a lower face, said upper face and said lower face being designed to converge toward one another while leaving a space acting as the outlet opening, said at least one shutter being arranged on the upper face or the lower face.

According to one example, the chamber comprises an inlet face for the inlet opening, an outlet face for the outlet opening, two side faces, an upper face and a lower face, said outlet face comprising two portions designed to converge toward one another while leaving a space acting as the outlet opening, said at least one shutter being arranged on one of the portions of the outlet face.

According to one example, said chamber has a volume of between 5 and 90 dm3.

According to one example, the chamber is such that at least the area of the inlet opening differs from the area of the inlet face.

The invention also relates to a spray insulation system, comprising a means P for generating a gas stream connected to the device for preparing an insulation product based on wool according to the invention, said means P for generating a gas stream being able to supply a gas stream in which flakes of wool are mixed.

According to one example, the material has one of the densities of around 5 to 15 kg/m3 for products based on glass wool and of around 15 to 50 kg/m3 for products based on rock wool.

DESCRIPTION OF THE FIGURES

Further particular features and advantages will become clearly apparent from the following description thereof, which is given by way of entirely nonlimiting indication, with reference to the appended drawings, in which:

FIG. 1 is a schematic depiction of a device for preparing an insulation product based on wool according to the prior art;

FIGS. 2, 3, 5 are schematic depictions of a device for preparing an insulation product based on wool according to the invention;

FIGS. 4*a*, 4*b* and 4*c* are schematic depictions of different shapes of a chamber of a device for preparing an insulation product based on wool according to the invention;

FIGS. 6*a*, 6*b*, 7 are schematic depictions of a first embodiment of the device for preparing an insulation product based on wool according to the invention;

FIGS. 8 to 10 are schematic depictions of a second embodiment of the device for preparing an insulation product based on wool according to the invention;

FIGS. 11 to 13 are schematic depictions of the drive means of a second embodiment of the device for preparing an insulation product based on wool according to the invention;

FIGS. 14 to 17 are schematic depictions of the device for preparing an insulation product based on wool according to the invention provided with two movable shutters;

FIGS. 18*a*, 18*b* and 19 are schematic depictions of variants of the device for preparing an insulation product based on wool according to the invention.

DETAILED DESCRIPTION OF THE INVENTION

FIGS. 2 and 3 show a device 10 for preparing an insulation product based on wool according to the invention. This device 10 comprises a chamber comprising an inlet opening 101 and an outlet opening 103. A gas stream f is introduced into the chamber 100 via the inlet opening, this gas stream f being produced by a means P for generating a gas stream. The inlet opening 101 also allows the introduction of a material L. This material L is a wool in the form of flakes or nodules, such as a rock wool or a glass wool or a cellulose wool. These nodules or flakes of mineral wool have a length of between 0.05 and 5 cm, in particular between 0.1 and 1 cm. These flakes or nodules are formed of fibers that are entangled in the form of small bundles, small rovings, or "pilling". This material L is introduced into the chamber via means for introducing a wool in the form of flakes or nodules into the chamber. The material L and the gas stream are thus introduced into the chamber 100 via a pipe t, itself connected to the means P for generating a gas stream, thereby forming a spray insulation system. The material L can be introduced into the gas stream in advance. The chamber 100 also comprises means for creating, within the chamber, an entrainment of the wool in one sense in a direction A and in the opposite sense in a direction B opposite to the direction A such that, within the chamber, there is at least one plane perpendicular to the direction A, where the wool entrained in the direction A crosses the wool entrained in the opposite sense in the direction B. The means for creating, within the chamber, an entrainment of the wool in one sense in a direction A and in the opposite sense in a direction B opposite to the direction A depend, for example, on the shape and the size of the chamber. An exiting stream is sprayed through the outlet opening 103.

As regards the chamber 100, the latter is designed such that the inlet opening 101 and the outlet opening 103 are arranged on opposite faces of the chamber. Thus, the inlet opening is arranged on an inlet face 100*a* while the outlet opening is arranged at an outlet face 100*b*. Preferably, the inlet opening 101 and the outlet opening 103 are opposite one another. The chamber is such that at least the area of the inlet opening differs from the area of the inlet face, meaning that the area of the inlet opening is smaller than the area of the inlet face. Preferably, the area of the inlet opening is equal to half the area of the inlet face, preferably to a third, a quarter or a fifth. Preferably, the area of the outlet opening also differs from the area of the outlet face. This chamber configuration allows the gas stream circulating therein to be disrupted. In the case of a chamber in which the inlet opening has the same area as the inlet face and the outlet opening has the same area as the outlet face, the entering gas stream is not subjected to turbulent flow for aerating the flakes of wool, the stream entering and then exiting without any residence time in said chamber.

In a first configuration, which can be seen in FIG. 4*a*, the chamber 100 also comprises at least two side faces 100*c*, an upper face 100*d* and a lower face 100*e*. In this first configuration, as seen from a side face, the chamber may thus have a square or rectangular or trapezoidal profile.

In a second configuration, which can be seen in FIG. 4*b*, the chamber 100 comprises at least two side faces 100*c* and an upper face 100*d* and a lower face 100*e*. The outlet face has been eliminated to the benefit of the upper face and the lower face. This is understood as meaning that the upper face 100*d* and the lower face 100*e* are arranged so as to make the outlet face useless. To this end, the upper face and the lower face are arranged such that the chamber, as seen from a side face, has a triangular profile. To this end, the upper face and the lower face converge toward one another. Such a triangular profile makes it possible to arrange the outlet opening at the junction between the upper face and the lower face.

In a third configuration, which can be seen in FIG. 4*c*, the chamber 100 comprises at least two side faces 100*c*, an upper face 100*d* and a lower face 100*e*. The outlet face 100*b* is divided into two parts 101*b*' that converge so as to locally/partially create a triangular profile. Such a triangular profile makes it possible to arrange the outlet opening 103 at the junction between the two parts that form the outlet face.

The chamber has dimensions that allow it to have a volume of, preferably, between 5 and 90 dm3.

The outlet opening 103 may have any shape, such as a circular shape 103*a*. Preferably, the outlet opening is in the form of a slot 103*b*. This slot extends horizontally with respect to the plane of the floor of the chamber, on the opposite side from the inlet face. This slot extends across part of or across the entire width of the chamber. This slot has a height of between 0.1 and 3 cm, preferably between 0.5 and 2 cm.

The advantage of a slot 103*b* is to allow the flakes to be expelled across a greater width and thus to make it possible to cover a larger area.

Cleverly, the chamber 100 is provided with a system 200 for adjusting the outlet opening that makes it possible to control the area of the outlet opening 103. Specifically, by controlling the area of the outlet opening 103, it is possible to vary the outlet speed of the stream. This is because the chamber is governed by the principle of conserving the mass flow of air such that the outlet stream is constant, it being the speed of this stream that varies. This increase in speed allows the exiting flakes to be sprayed to a greater distance. This allows the operator to spray the flakes of insulating products over a larger radius without moving. According to the invention, with the stream entering the chamber at a speed of between 8 and 30 m/s, said chamber provided with the system 200 for adjusting the outlet opening makes it possible to have an outlet stream having a speed of between 5 and 60 m/s. Specifically, while the increase in speed makes it possible to have a greater range for the spray of flakes, having a lower speed makes it possible to avoid difficult movements. It will therefore be understood that the system 200 for adjusting the outlet opening is such that it allows adjustment of the outlet opening from 0 to 100%. The outlet opening can therefore be 100% open or closed (that is to say 0% open) or adopt any of the positions between 0 and 100%.

Thus, with this in mind, the outlet opening 103 has a larger area than the inlet opening 101. The system 200 for adjusting the outlet opening thus makes it possible to adjust the area of the outlet opening 103 such that it is greater than, the same as or less than the area of the inlet opening. This means that the outlet opening can have a larger area than the inlet opening.

The material L is therefore aerated in said chamber. The insulation products obtained after the aeration step, at the outlet, have low densities, in particular of around 5 to 15 kg/m3 for products based on glass wool and around 15 to 50 kg/m3 for products based on rock wool.

To allow this modification of the area of the outlet opening 103, the system 200 for adjusting the outlet opening comprises at least one shutter 201, as can be seen in FIG. 5. This shutter is mounted so as to take up several different positions.

In a first embodiment, the movable shutter 201 is moved manually.

In a first embodiment, which can be seen in FIGS. 6*a*, 6*b* and 7, adjustment is effected by interlocking. Specifically, the system 200 for adjusting the outlet opening comprises means 203 for positioning the shutter 201 that use an interlocking system 210. In this first embodiment, the chamber 100 is provided, on one of its faces, with a plurality of holes 211, which are preferably blind. These holes 211 extend along at least one line, preferably two parallel lines, which are perpendicular to the width of the chamber. These blind holes are regularly spaced apart. The two parallel lines have, between one another, a spacing which is at least equal to half the width of the chamber.

The movable shutter 201 comprises at least one pair of studs 213. This pair of studs 213 is used when the shutter 201 comprises a plurality of holes 211 arranged in the form of one line. When the shutter 201 comprises holes 213 that are arranged so as to form two lines, the shutter 201 comprises at least one, or even at least two pairs of studs 213. Each stud extends orthogonally to the plane of the shutter.

In the case of holes 211 arranged in the form of a single line, the pair of studs 213 is arranged such that the spacing between the two studs allows the latter to be fitted into two holes, which are not necessarily contiguous.

In the case of holes 211 arranged in the form of two lines, the studs 213 are arranged such that the spacing between the two studs 213 of a pair is identical to the spacing between the two parallel lines of holes 211. The two pairs are also positioned with respect to one another such that each stud 213 can fit in a hole 211. Thus, it becomes possible to modify the position of the shutter 201 by disposing the studs in different holes along the parallel lines. Thus, the holes and the studs form means 203 for positioning the shutter. Thus, the position of the shutter 201 with respect to the holes 211 makes it possible to adjust the outlet opening. The holes 211 of one line are, preferably, spaced apart regularly to allow linear adjustment of the outlet opening. It is also possible for the user to move the shutter 201 from one end position to another without passing through intermediate positions.

In a second embodiment, which can be seen in FIGS. 8 and 9, the means 203 for positioning the shutter use a rail system 220. Such a system is designed such that the chamber 100 is provided, on at least one of its faces, with two parallel rails for guiding the shutter 201, said shutter then being capable of moving in translation.

According to one example, each rail 221 has a C-shaped profile. The rails are positioned such that the C-profiles face one another. The spacing is such that the shutter 201 fits in the rails 221 so as to slide. For locking in position, a through-hole having a screw (not shown) can be used, the tightening of the screw making it possible to tighten and therefore lock the position of the shutter. The user can thus position the shutter 201 as desired and then lock it in said position.

According to another example, the rail system 220 comprises receiving rails 223. Each rail 223 has a U-shaped profile. The rails 223 are positioned such that the U-profiles are spaced apart from one another and serve as receiving rails. The shutter 201 also comprises two longitudinal rails known as sliding rails 224. The arrangement of the sliding rails 224 of the shutter 201 is such that said sliding rails 224 of the shutter fit in the U-shaped rails 223 so as to slide. For locking in position, in an example that is not shown, there is a through-hole having a screw, the tightening of the screw making it possible to tighten and therefore lock the position of the shutter.

In a variant that can be seen in FIG. 10, indexing means 205 are used to lock the position of the shutter. To this end, two pairs of toothings 205*a*, 205*b* are arranged, one pair 205*a* on the shutter, which engages with a pair of toothings 205*b* on the receiving rails 221, 223. The toothings are designed to engage with one another and to allow the shutter to move along the rails in two senses of movement. This movement of the shutter thus makes it possible to obstruct the outlet opening to a greater or lesser extent, the toothings allowing a controlled, linear movement of said shutter.

In a second embodiment, the movable shutter 201 is moved electrically. This means that the shutter is moved by virtue of drive means 230. These drive means 230 comprise at least one motor 231, at least one serration-engagement element 232 and at least one gear element 233 for creating the mechanical link between said motor and the serration-engagement element.

In a first embodiment, the chamber is provided with two parallel rails for guiding the shutter.

According to one example, which can be seen in FIGS. 11 and 12, each rail 223 has a U-shaped profile. The rails 223 are positioned such that the U-profiles are spaced apart from one another. The shutter comprises two longitudinal rails 224. The arrangement of the rails 224 of the shutter is such that said rails 224 of the shutter fit in the U-shaped rails 223 so as to slide. The shutter 201 is dimensioned such that a portion 201' protrudes or overhangs with respect to the chamber, more particularly at a side face. This arrangement advantageously allows the presence of the serration-engagement element 232, extending linearly, at the overhanging portion of the shutter. This serration-engagement element 232 cooperates with a gear element 233 arranged on the side face of the chamber, said gear element being connected directly or indirectly to a shaft of a motor 231. The setting of this motor shaft in rotation sets the gear element in rotation, the teeth of which mesh with the serration-engagement element of the shutter in order to move the latter.

In another example, which can be seen in FIG. 13, each rail 221 has a C-shaped profile. The rails 221 are positioned such that the C-profiles are spaced apart from one another. The shutter 201 is designed to fit in the C-shaped rails so as to slide. On its face facing the chamber, the shutter 201 comprises a serration-engagement element 232 extending linearly. Facing this toothing of the shutter, the chamber 100 comprises a slot 100', through which at least one portion of a gear element 233 passes, this gear element 233 cooperating with the serration-engagement element 232 of the shutter 201. Since the gear element is connected directly or indirectly to a motor shaft, the setting of this motor shaft in rotation sets the gear element in rotation, the teeth of which mesh with the serration-engagement element of the shutter in order to move the latter.

The serration-engagement element 232 may be in the form of a toothing or a plurality of through-notches or blind notches in which the teeth of the pinion fit.

In the first configuration, having a single movable shutter 201 arranged on the outlet face makes it possible to reduce the size of the slot and therefore to increase the spraying range of the insulating flakes.

In the second and third configurations, having a single movable shutter 201 arranged on the upper or lower face or on one of the parts of the outlet face makes it possible to reduce the area when looking at the outlet opening 103 from in front of the latter. Nevertheless, having a single shutter causes a part of the stream of flakes sprayed to be oriented upward or downward depending on the position of the shutter. Thus, the shutter 201 positioned on the upper part of the chamber 100 will direct the stream downward and vice versa.

In a variant of the embodiments, the chamber 100 is provided with two shutters 201, the two shutters being movable, as can be seen in FIG. 14.

Thus, in the first embodiment, the two shutters 201 can be moved manually independently, as can be seen in FIG. 15.

In the second embodiment, each of the shutters can be controlled by its own motor 231 in order for the movement of each shutter to be independent, as can be seen in FIG. 16.

This independence of the movements is advantageous in the second and third configurations of the chamber. This is because, in these configurations, the presence of a single shutter causes the stream to be diverted. With the presence of two shutters that are movable independently, it is possible, by altering the movement of each shutter, to control this diversion of the air in order to have an upward or downward diversion. In addition, it is advantageously possible to move the two shutters simultaneously such that the movement of the two shutters is identical.

According to an alternative that can be seen in FIG. 17, the two shutters 201 are controlled by a single motor 231. To this end, the toothing of each shutter engages with a pinion. These pinions are part of a gearing connected mechanically to the single motor 231. Thus, the setting of the motor in rotation sets the pinions of the gearing in rotation and, more particularly, the pinions engaging with the toothings of the shutters. This alternative allows the two shutters 201 to move simultaneously and at the same speed if the pinions by which they are driven are identical.

Although this alternative does not allow the operator to guide the outlet stream downward or upward, it makes it possible to have a slot that is regulated uniformly, thereby avoiding any risk of a stream that is oriented upward or downward.

Of course, the present invention is not limited to the example illustrated, but can be varied and modified in various ways that will become apparent to a person skilled in the art.

Specifically, it is also possible for the gear train that controls the movement of the shutter(s) to be actuated manually. To this end, one of the gears is provided with a gripping element that allows the operator to act on the gear train in order to control the movement of the shutter(s).

Of course, the invention is not limited to an outlet opening in the form of a slot. The outlet opening may have a circular or parallelepipedal shape. The system for adjusting the outlet opening is then adapted in accordance with the shape of said outlet opening. For example, for a circular opening, the system for adjusting the outlet opening comprises shutters or a diaphragm 203, as can be seen in FIG. 19.

Similarly, the shutter(s) may move in a different direction. Specifically, in the above examples, the shutters move in a direction which is, substantially, parallel to the direction of the length of the chamber. However, it is conceivable for the direction of movement of the shutter(s) to be orthogonal to the length of the chamber, as can be seen in FIGS. 18*a* and 18*b*.

The invention claimed is:

1. A device for preparing an insulation product based on wool, comprising a chamber comprising: at least two side faces, an inlet opening through which a stream of carrier gas and a wool in the form of nodules or flakes are introduced therein, and an outlet opening downstream of the inlet opening and through which flakes mixed with an outlet gas stream are expelled, the inlet opening being arranged on an inlet face and the outlet opening being arranged at an outlet face, the at least two side faces extending between the inlet face and the outlet face, an area of the inlet opening differing from an area of the inlet face and an opening area of the outlet opening differing from an area of the outlet face such that the stream of carrier gas circulating within the chamber is disrupted therein, and the inlet opening and the outlet opening being arranged on opposite faces of the chamber, and a system for adjusting the outlet opening to control the opening area of the outlet opening from 0 to 100%, said system for adjusting the outlet opening thus making adjustment of the opening area of the outlet opening possible so that the opening area of the outlet opening is greater than, equal to, or less than the area of the inlet opening, and wherein the system for adjusting the outlet opening comprises at least one shutter arranged on an external part of the outlet face of the chamber and a device adapted to position the at least one shutter.

2. The device as claimed in claim 1, wherein the device adapted to position the at least one shutter comprises a plurality of blind holes arranged, on one of said faces of the chamber, in at least one line and at least one pair of studs arranged on said shutter in order to fit in two blind holes.

3. The device as claimed in claim 2, wherein the plurality of blind holes are arranged in two parallel lines, said at least one shutter comprising at least two pairs of studs arranged such that each stud of a pair fits into a hole in a different line.

4. The device as claimed in claim 1, wherein the device adapted to position the at least one shutter comprises a rail system comprising two receiving rails arranged on the chamber and two sliding rails arranged on the at least one shutter, an arrangement of said sliding rails being such that said sliding rails fit in the receiving rails so as to slide.

5. The device as claimed in claim 4, wherein the device adapted to position the at least one shutter comprises drive means comprising at least one motor, at least one serration-engagement element arranged on the shutter and at least one gear element for creating a mechanical link between said motor and the serration-engagement element.

6. The device as claimed in claim 1, wherein the system for adjusting the outlet opening comprises two shutters that are each arranged on a face of the chamber and a device adapted to position the at least one shutter.

7. The device as claimed in claim 6, wherein the device adapted to position the at least one shutter comprises, for each shutter, drive means comprising a motor, at least one serration-engagement element arranged on the shutter and at least one gear element for creating a mechanical link between said motor and the serration-engagement element.

8. The device as claimed in claim 6, wherein the device adapted to position the at least one shutter comprise drive means comprising a motor, at least one serration-engagement element arranged on each shutter and at least one gear element for creating the mechanical link between said motor and the serration-engagement element of each shutter.

9. The device as claimed in claim 1, wherein the shutter is in the shape of a diaphragm arranged at the outlet opening.

10. The device as claimed in claim 9, wherein the at least one diaphragm arranged at the outlet opening is circular.

11. The device as claimed in claim 1, wherein the chamber comprises an upper face and a lower face, said system for adjusting the outlet opening being arranged on the outlet face.

12. The device as claimed in claim 1, wherein said chamber has a volume of between 5 and 90 dm3.

13. The device as claimed in claim 1, wherein a material of the insulation product has one of the densities of around 5 to 15 kg/m3 for products based on glass wool and of around 15 to 50 kg/m3 for products based on rock wool.

* * * * *